United States Patent [19]

Bienfait et al.

[11] Patent Number: 4,675,368

[45] Date of Patent: Jun. 23, 1987

[54] PROCESS FOR INHIBITING CRUST FORMATION IN REACTORS DURING ALPHA-OLEFIN PREPOLYMERIZATION MODIFICATION OF ZIEGLER CATALYST

[75] Inventors: Charles Bienfait, São Paulo, Brazil; Léopold Demiddeleer, Sterrebeek, Belgium

[73] Assignee: Solvay & Cie., Brussels, Belgium

[21] Appl. No.: 753,355

[22] Filed: Jul. 9, 1985

Related U.S. Application Data

[63] Continuation of Ser. No. 06,539,065, Oct. 4, 1983, abandoned.

[30] Foreign Application Priority Data

Oct. 4, 1982 [FR] France .................. 82 16722

[51] Int. Cl.[4] .................. C08F 2/06; C08F 4/16
[52] U.S. Cl. .................. 526/75; 526/74; 526/128; 526/351; 526/352
[58] Field of Search .................. 526/74, 128, 75; 524/731; 528/484

[56] References Cited

U.S. PATENT DOCUMENTS

| | | | |
|---|---|---|---|
| 3,769,233 | 10/1973 | Hermans et al. | 252/429 A |
| 3,900,454 | 8/1975 | Sato et al. | 526/128 X |
| 3,901,863 | 8/1975 | Berger et al. | 260/88.2 R |
| 4,105,847 | 8/1978 | Ito et al. | 526/128 X |
| 4,109,071 | 8/1978 | Berger et al. | 526/144 |
| 4,187,385 | 2/1980 | Iwao et al. | 526/128 |
| 4,210,729 | 7/1980 | Hermans et al. | 525/247 |
| 4,210,738 | 7/1980 | Hermans et al. | 526/152 |
| 4,235,747 | 11/1980 | Leung | 252/429 |
| 4,245,071 | 1/1981 | Kondo et al. | 526/114 |
| 4,295,991 | 10/1981 | Wristers | 252/429 |
| 4,296,223 | 10/1981 | Berger | 526/125 |
| 4,324,693 | 4/1982 | Arzoumanidis et al. | 252/429 |
| 4,359,402 | 11/1982 | Haas et al. | 252/429 B |
| 4,442,224 | 4/1984 | Takitani et al. | 526/128 X |

FOREIGN PATENT DOCUMENTS 0045969 2/1982 European Pat. Off. .

OTHER PUBLICATIONS

S. Sivaram, "Second Generation Ziegler Polyolefin Processes", *Ind. Eng. Chem., Prod. Res. Dev.*, vol. 16, No. 2, 1977, pp. 121–128.

*Primary Examiner*—Joseph L. Schoter
*Assistant Examiner*—F. M. Teskin
*Attorney, Agent, or Firm*—Spencer & Frank

[57] ABSTRACT

Process for inhibiting crust formation in reactors used for polymerising alpha-olefines, such as ethylene and propylene, in the presence of particles of catalytic solids containing titanium and chlorine in the combined state.

The polymerisation is carried out in the presence of an amount of a silicone oil which is less than 1% by weight, relative to the weight of catalytic solid.

11 Claims, No Drawings

PROCESS FOR INHIBITING CRUST FORMATION IN REACTORS DURING ALPHA-OLEFIN PREPOLYMERIZATION MODIFICATION OF ZIEGLER CATALYST

This application is a continuation of application Ser. No. 06/539,065, filed Oct. 4, 1983, now abandoned.

The present invention relates to a process for inhibiting crust formation in reactors used for polymerising alpha-olefines in the presence of particles of catalytic solids containing titanium and chlorine in the combined state.

Catalyst systems comprising a transition metal compound, generally a halogen compound of titanium, and an organometallic compound, generally an organoaluminium compound, are well known, under the name of "Ziegler-type catalysts", for polymerising olefines at low pressure.

These catalyst systems have formed the subject of improvements enabling them to be used for polymerising alpha-olefines, in particular ethylene said propylene, with performance characteristics such that the subsequent purification of the resulting polymers in respect of catalyst residues could be considerably simplified and even totally dispensed with. These so-called "second generation" Ziegler-type catalyst systems generally comprise particles of a catalytic solid containing titanium and chlorine in the combined state. This solid is most commonly chosen either from amongst reduced titanium chlorides which have undergone an activation treatment to improve their performance characteristics, or from amongst the solids obtained by the chemical reaction of a titanium compound with a magnesium compound. It has already been proposed to modify particles of catalytic solids of this kind by bringing them into contact with alpha-olefines under conditions which lead to the formation of small amounts of prepolymers associated with the catalytic solids. This modification can have various advantages such as maintaining the catalytic properties with time, improving the firmness, the stability and the mechanical properties and improving the properties, especially the morphology, of the resulting polymers by virtue of easier control over the polymerisation conditions. In general, the relative amount of prepolymer associated with the particles is small, so that the prepolymer necessarily has a low average molecular weight. Now, it has been found that the walls of the reactors in which the modified particles are produced become covered with deposits which are generally in the form of vaselines or of crusts having a greater or lesser degree of hardness and adhesion.

Furthermore, it has also been observed that deposits of the same kind are formed on the walls of the reactors used for polymerising alpha-olefines in the presence of modified or unmodified particles of catalytic solids when the polymerisation is carried out under conditions which lead to polymers containing a large fraction of low molecular weight polymer chains.

In all cases, these deposits must be removed by frequent, arduous and expensive cleaning of the reactor walls.

The aim of the present invention is very substantially to reduce, and even completely to prevent, the formation of these deposits on the reactor walls.

For this purpose, the present invention relates to a process for inhibiting crust formation in reactors used for polymerising alpha-olefines in the presence of particles of catalytic solids containing titanium and chlorine in the combined state, in which process the polymerisation is carried out in the presence of an amount of less than 1% by weight, relative to the weight of catalytic solid, of a silicone oil.

The term "polymerisation of alpha-olefines" is understood as meaning either the conventional manufacture of alpha-olefine polymers or the modification of particles of catalytic solids by the formation of small amounts of prepolymers, which is also called "prepolymerisation".

The best results as regards the inhibition of crust formation have been recorded during these prepolymerisations.

As is known, the conventional polymerisation of alpha-olefines in the presence of a Ziegler-type catalyst system can be carried out in solution or in suspension in a hydrocarbon solvent or diluent (1), in the gas phase or in the monomer kept in the liquid state. The solvent or diluent (1) is preferably an alkane or cycloalkane, such as isobutane, pentane, hexane, heptane or cyclohexane, or a mixture thereof, and in particular hexane. The polymerisation pressure is generally between atmospheric pressure and 100 bars and the temperature is generally between 20° and 200° C.

The organometallic compound is generally an organoaluminium compound (2) of the formula $AlR_nX_{3-n}$, in which R is a hydrocarbon radical containing from 1 to 20 carbon atoms, X is a halogen and n is a number such that $0 < n \leq 3$. R is preferably chosen from amongst alkyl, alkenyl, aryl, cycloalkyl, arylalkyl and alkylaryl radicals. The best results are obtained when R is a linear or branched alkyl radical containing from 1 to 8 carbon atoms. If the organoaluminium compound contains a halogen, this is preferably chlorine. Examples which may be mentioned of organoaluminium compounds (2) frequently used are triethyl-, triisobutyl-, trihexyl- and trioctyl-aluminium and ethylaluminium chlorides.

It is also possible to use organoaluminium compounds (2) obtained by reacting trialkylaluminium compounds or dialkylaluminium hydrides in which the radicals contain from 1 to 20 carbon atoms with diolefines containing from 4 to 20 carbon atoms, and more particularly the compounds called isoprenylaluminium compounds.

The prepolymerisations can be carried out under the general conditions mentioned above in relation to conventional polymerisation, the particular conditions of these prepolymerisations being mentioned below.

The prepolymerisation can be carried out in the medium in which the particles of catalytic solid were prepared. It can also be carried out after separation of the particles from the medium in which they were prepared, and, if appropriate, after washing, either on the particles as such or on the particles resuspended, directly or after storage, in a fresh liquid hydrocarbon diluent such as the diluents (1) mentioned above, if necessary in the presence of a sufficient amount of organoaluminium compound (2) to form the prepolymer.

When the prepolymerisation is carried out in the medium in which the particles of catalytic solid were prepared, it can take place in the absence of organoaluminium compound (2) if the catalytic solid on which it is carried out contains a sufficient amount of residues of the said compound. The prepolymerisation is generally carried out in such a way that an amount of alpha-olefine polymer representing from 1 to 1,000% of the weight of the catalytic solid, most commonly from 3 to 100% and preferably from 5 to 50% of this weight, is associated with the particles of catalytic solid.

Other details relating to prepolymerisation treatments carried out on catalytic solids containing titanium and chlorine in the combined state can be found in U.S. Pat. No. A-4,295,991 (EXXON RESEARCH AND ENGINEERING CO), U.S. Pat. No. A-4,235,747 and U.S. Pat. No. A-4,324,693 (STANDARD OIL COMPANY (Indiana)) and in European patent application Ser. No. A-0,045,969 (PHILLIPS PETROLEUM COMPANY).

The alpha-olefine from which the polymer is formed is generally chosen from amongst alpha-monoolefines containing from 2 to 18 and preferably from 2 to 8 carbon atoms in their molecule, in particular ethylene and propylene, and also mixtures thereof.

The particles of catalytic solids containing titanium and chlorine in the combined state, in the presence of which the alpha-olefine polymer is formed, are well known. In general, they are either catalytic solids based on titanium trichloride, which are called "solids of the first type" below, or catalytic solids obtained by the chemical reaction of at least one magnesium compound with at least one titanium compound, and if appropriate with other compounds, which are called "solids of the second type" below.

The catalytic solids of the first type are generally prepared by reducing titanium tetrachloride, in a known manner, with aluminium or with an organoaluminium compound (2) and by subjecting the reduced solids thus obtained to activation treatments suitable for stabilising or improving their catalytic performance characteristics, essentially their ability to catalyse the polymerisation of alpha-olefines with higher yields, and also, if they are intended for catalysing the polymerisation of propylene and higher alpha-olefines, their stereospecificity.

These activation treatments are well known and have been amply described in the literature. They can consist of grinding treatments during or after the reduction, if appropriate in the presence of complexing agents, or of heat treatments of the reduced solids, also if appropriate in the presence of complexing agents or other additives.

Details relating to the operating conditions of the most common activation treatments can be found in particular in Belgian Pat. No. A-864,708 (SUMITOMO CHEMICAL COMPANY LTD), in U.S. Pat. No. A-4,295,991 (EXXON RESEARCH AND ENGINEERING CO) and in the documents cited in the latter.

The catalytic solids of the second type are prepared by reacting at least one magnesium compound with at least one titanium compound. Examples which may be mentioned of magnesium compounds which can be used to prepare the solids of the second type are the oxygen compounds, in particular the organic oxygen compounds, for example the alkoxides, the halogen compounds, in particular the chlorides, for example the chlorides activated, if appropriate, by grinding or by treatment with complexing agents, and the organomagnesium compounds, in particular the alkyl- and arylmagnesium compounds, for example dibutyl- and diphenyl-magnesium.

Examples which may be mentioned of titanium compounds which can be used to prepare the solids of the second type are the inorganic halogen compounds, in particular the chlorides, for example titanium trichloride and tetrachloride, and the organic oxygen compounds optionally containing a halogen, in particular the alkoxides and halogenoalkoxides.

The processes for the preparation of the solids of the second type generally involve at least a third constituent, which is brought into contact with the magnesium compound, or with the titanium compound, or with the product resulting from their reaction. These ingredients can be brought into contact by any appropriate method, for example by mixing with or without cogrinding and, if appropriate, in the presence of an inert hydrocarbon diluent (1).

Examples which may be mentioned of third constituents which can be used to prepare the solids of the second type are organic complexing agents and inorganic and organic chlorides.

Details relating to the procedures for preparing solids of the second type can be found, in particular, in the Patents and Patent Applications listed in the article by S. Sivaram entitled "Second Generation Ziegler Polyolefin Processes", published in Ind. Eng. Chem., Prod. Res. Dev., volume 16, no.2, 1977, pages 121 to 128. Excellent catalytic performance characteristics have been recorded with solids of the second type such as those described in U.S. Pat. No. 3,901,863; U.S. Pat. No. 4,296,223; and U.S. Pat. No. 4,109,071 (SOLVAY & Cie).

According to the invention, the polymerisation of alpha-olefines is carried out in the presence of a silicone oil.

The term "silicone oil" is understood as denoting fluids containing a compound which corresponds to the formula:

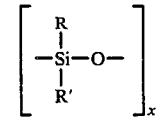

in which R and R' are identical or different and represent a radical chosen from amongst alkyl radicals containing from 1 to 5 carbon atoms and aryl radicals, and in which x is between 3 and 2,000; preferably, R and R' are identical and are methyl or phenyl radicals and x is between 3 and 100. Excellent results have been recorded with the commercial compounds variously called "dimethylsilicone oils" or "methylpolysiloxanes", in the composition of which R and R' represent a methyl radical, and which are characterised by kinematic viscosities of between about 0.5 and about $2.10^6$ cSt (centistokes) (about $5.10^{-6}$ to 2 m$^2$/s), preferably of between about 5 and about 30,000 cSt ($5.10^{-5}$ to $3.10^{-2}$ m$^2$/s), and more especially with the silicone oils marketed, for example, by Rhone-Poulenc under the name Rhodorsil Huiles 47, by Dow Corning under the name "No.200 fluids" and by General Electric under the name "GE silicone oils".

The silicone oil can be introduced into the reactor by any method which is compatible with its physical form. Thus, if the polymer formation is carried out in a liquid medium such as a hydrocarbon diluent (1), it is possible simply to add the silicone oil to this medium before bringing the catalytic solid into contact with the alpha-olefine under polymerising conditions. This procedure is preferred. It is also possible to introduce the silicone oil into the reactor in the form of a mixture with an organoaluminium compound (2), if this compound is used, or alternatively in the form of a mixture with the alpha-olefine itself, in particular if the polymer formation is carried out in the absence of a liquid medium.

The temperature at which the silicone oil is introduced into the reactor is not critical and is generally below or equal to the polymer formation temperature, care being taken, however, to ensure that the oil remains sufficiently fluid.

The amount of silicone oil present during the polymerisation constitutes an essential characteristic of the invention. In fact, it has been found, surprisingly, that it suffices to ensure the presence of very small amounts of silicone oil in the reactor in order to deposits from appearing on its walls, and that these very small amounts do not modify, to any detectable extent, the catalytic properties of the catalytic solid present. According to the invention, the silicone oil is introduced into the reactor at a rate of less than 1% by weight, relative to the weight of catalytic solid.

In general, the amount of silicone oil present is between about 1 ppm (part per million) and about 8,000 ppm, relative to the weight of catalytic solid, and preferably between about 50 and 5,000 ppm. Very good results have been recorded in the case of prepolymerisations carried out on catalytic solids of the first type in the presence of 500 to 3,000 ppm of silicone oil, relative to the weight of catalytic solid, and in the case of prepolymerisations carried out on catalytic solids of the second type in the presence of 100 to 1,000 ppm of silicone oil, relative to the weight of catalytic solid.

The invention is illustrated by the examples below.

EXAMPLE 1

A series of preparations of particles of catalytic solid are made up using the reagents (1), (2), (3) and (4) defined in Examples 1R to 5 of U.S. Pat. No. 4,109,071 (SOLVAY & Cie) and according to the procedure of Example 2. The catalytic solid formed is not separated from the reaction medium, and a volume of silicone oil (sold by Rhone-Poulenc under the name Rhodorsil Huile 47 V 300) equivalent to 6 ml per kg of catalytic solid (that is to say about 5000ppm) is added to the medium at the end of the preparation. After this addition, the reactor containing the suspension of particles of solid catalytic complex is placed under ethylene pressure, maintained until about 0.1 kg has been introduced per kg of catalytic solid so as to give particles with which a prepolymer containing about 10% by weight of polyethylene is associated. During the prepolymerisation operations, no formation of a deposit is observed on the walls of the reactor containing the suspension of particles of the catalytic solid.

By way of comparison, a series of preparations of particles of a catalytic solid associated with the same amount of ethylene prepolymer, but prepared in the absence of silicone oil, leads to the formation of adhesive crusts on the walls of the reactor in which the prepolymerisation is carried out, and these crusts can only be removed by washing with hot hexane.

EXAMPLE 2

A polymerisation experiment is carried out with particles of a catalytic solid prepared from the reagents (1), (2), (3) and (4) defined in Examples 1R to 5 of U.S. Pat. No. 4,109,071, under the conditions described in these examples, by introducing the catalytic solid into the polymerisation autoclave in the form of a suspension in hexane, which also contains the silicone oil used in Example 1, at a rate of 1% by weight, relative to the weight of catalytic solid present in the suspension.

Under these conditions, the polymerisation experiment proceeds without crust formation being observed on the walls of the autoclave.

EXAMPLE 3

The steps, described in Example 1 above, in which silicone oil is added and in which the reactor is placed under ethylene pressure are repeated on a catalytic solid prepared as described in Example 1 of, U.S. Pat. No. 4,296,223 (SOLVAY & Cie), but not separated from the medium in which it was prepared. No formation of any deposit is observed on the walls of the reactor containing the suspension of catalytic solid.

EXAMPLE 4

The procedure of Examples 1 and 3 is repeated on particles of a catalytic solid prepared as follows: A 1000 cc capacity flask equipped with a stirrer is charged with 21 g (0.45 mole) of dehydrated ethanol; 3.7 g (0.15 mole) of metallic magnesium powder and 102 (0.3 mole) of titanium tetrabutylate [Ti(O—n—$C_4H_9$)4] are added thereto. The mixture is agitated under reflux at 130° C. for 2 hours in the absence of water or water vapor while removing hydrogen formed by the reaction. Low-boiling-point substances are distilled at 90° C. and removed from the reaction mixture. The remaining mixture (1) is cooled to 60° C. Then, 200 ml of n-hexane is added to the mixture and 95 g (0.75 mole) of ethyl aluminum dichloride [Al($C_2H_5$)Cl2] is added dropwise to the mixture over a period of 4 hours at 45° C., following which the reaction mixture is agitated at 60° C. for 1 hour. Then, n-hexane is added to the reaction product, and it is washed by decantation, i.e., the washing is conducted by repeating the steps of agitating the mixture, allowing it to stand still, removing the supernatant liquor and adding fresh n-hexane to the residue, until no chlorine ion is detected in the supernatant liquor. The volume of the resulting suspension is adjusted to 500 ml; by addition of n-hexane. During the prepolymerisation operation, no formation of any deposit is observed on the walls of the reactor containing the suspension of catalytic solid.

EXAMPLE 5

Particles of a catalytic solid based on violet $TiCl_3$ are prepared as described in Example 30 of U.S. Pat. No. 3,769,233 (SOLVAY & Cie). This solid, which contains 850 g of $TiCl_3$ per kg, is resuspended in fresh hexane; diethylaluminium chloride is introduced into the suspension at 0° C., with agitation, in an amount such that the molar ratio of the diethylaluminium chloride to the titanium trichloride present in the catalytic solid is about 0.25. An amount of silicone oil (sold by Rhône-Poulenc under the trademark Rhodorsil Huile 47 V 300) equivalent to 1% by weight of the amount of catalytic solid present in the suspension is then introduced. Finally, propylene is introduced into the gaseous layer covering the suspension in the reactor, until a "prepolymer" containing about 15% by weight of propylene is obtained. Under these conditions, the prepolymerisation does not result in the formation of any deposit on the walls of the enclosure.

EXAMPLE 6

The procedure of Examples 1 and 3 is repeated on a catalytic solid prepared as described in Example 1.a) of U.S. Pat. No. 4,245,071 (SOLVAY & Cie) and finally resuspended in hexane. No deposit appears on the walls of the reactor in which the prepolymerisation is carried out.

EXAMPLE 7

(COMPARATIVE)

The preparation of the catalytic solid described in Example 1 of U.S. Pat. No. 4,210,738 (SOLVAY & Cie) is repeated with an additional step consisting in introducing propylene, at about 60° C. and under a pressure of 3 bars, into the gaseous layer covering the enclosure for preparation of the "reduced solid", not separated from the reduction medium, until 20% by weight of polymerised propylene is obtained, relative to the weight of "reduced solid". After cooling and washing of the "reduced solid" prepolymerised in this way, the preparation of the catalytic solid is continued as indicated under items B and C of Example 1 of U.S. Pat. No. 4,210,738.

It is observed that, after the additional step mentioned above, the walls of the reactor for the preparation of the "reduced solid" are covered with an adhesive deposit which can only be removed by washing with hot hexane.

EXAMPLE 8

Example 7 is repeated, the only difference being that the "reduced solid" suspended in the reduction medium is treated, before the propylene is introduced, with silicone oil of trademark Rhodorsil Huile 47 V 300 at a rate of 1% by weight, relative to the weight of "reduced solid".

The walls of the reactor in which the additional prepolymerisation step is carried out remain free of any deposit resulting from the prepolymerisation.

EXAMPLE 9

Example 11 of U.S. Pat. No. 4,210,729 (SOLVAY & Cie) is repeated, 10 mg of silicone oil of trademark Rhodorsil Huile 47 V 300 being introduced into the suspension of the catalytic solid, agitated at 25° C., before the propylene gas is introduced.

It is observed that, under these conditions, the walls of the reactor in which the prepolymerisation is carried out remain free of deposits.

We claim:

1. A process for inhibiting crust formation in reactors during (alpha-olefin) prepolymerization modification of particles of catalytic solids containing titanium and chlorine in the combined state, comprising combining a (polylalpha-olefin) with the particles of catalytic solids in an amount of from 1% to 1000% by weight of the catalytic solids by carrying out the prepolymerization in the presence of solely silicone oil in an amount which is from 50 ppm to 1% by weight, relative to the weight of catalytic solids.

2. Process according to claim 1, characterized in that the amount of silicone oil is between about 50 ppm and about 5,000 ppm, relative to the weight of catalytic solids.

3. Process to claim 1, characterized in that the silicone oil contains a compound corresponding to the formula:

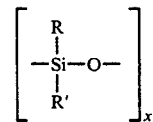

in which R and R' are identical or different and represent an alkyl radical containing from 1 to 5 carbon atoms or an aryl radical, and in which x is between 3 add 2,000.

4. Process according to claim 3, characterized in that each of R and R' represent a methyl radical and in that the silicone oil has a kinematic viscosity at 25° C. of between about 0.5 and about $2 \times 10^6$ cSt.

5. Process according to claim 1, characterized in that the alpha-olefin is chosen from ethylene and propylene.

6. A process for inhibiting crust formation in reactors during alpha-olefin prepolymerization modification of particles of catalytic solids containing titanium and chlorine in the combined state, comprising conducting the prepolymerization in a reaction consisting essentially of the medium in which the particles of catalytic solids were prepared and a silicone oil in an amount of from 50 ppm to 1% by weight relative to the weight of the catalytic solids, wherein poly(alpha-olefin) in an amount of from 1 to 1000% of the weight of the catalytic solids is combined with said particles of catalytic solids, said particles of catalytic solids containing residues of an organo aluminum compound of the formula $AlR_nX_{3-n}$, wherein R is a hydrocarbon radical containing from 1 to 20 carbons atoms, X is a halogen, and n is a number such that $0 < n \leq 3$, said prepolymerization taking place in the absence of the organo aluminum compound in the reaction medium.

7. In a process for inhibiting crust formation in a reactor during α-olefin prepolymerization modification of particles of catalytic solids containing titanium and chlorine in the conbined state, the improvement comprising
combining a poly(alpha-olefin) with the particles of catalytic solids in an amount between about 1% and 1000% by weight of the catalytic solids by prepolymerizing in a reaction medium consisting essentially of the liquid medium wherein the particles of catalytic solids were prepared and a silicone oil; said silicone oil being present in an amount between about 50 ppm and 1% by weight relative to the weight of catalytic solids; said prepolymerization taking place in the absence of an organo aluminum compound in the reaction medium.

8. The process of claim 7 wherein the silicone oil is present in an amount between about 50 ppm and 5,000 ppm relative to the weight of catalytic solid.

9. The process of claim 7 wherein the silicone oil contains a compound corresponding to the formula:

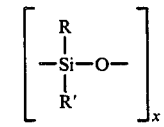

wherein

R and R' are separately in each instance $C_1$–$C_5$ alkyl or aryl, and x is between 3 and 2,000.

10. The process of claim 9 wherein each of R and R' are methyl, and the silicone oil has a kinematic viscosity at 25° C. of between about 0.5 and $2.10^6$ cSt.

11. The process of claim 7 wherein the α-olefin is selected from the group consisting of ethylene and propylene.

* * * * *